No. 770,356. Patented September 20, 1904.

UNITED STATES PATENT OFFICE.

MOSES PROSSER DAVIES AND EDWIN WILDING, OF LONDON, ENGLAND.

YEAST.

SPECIFICATION forming part of Letters Patent No. 770,356, dated September 20, 1904.

Application filed March 10, 1902. Renewed April 11, 1904. Serial No. 202,671. (No specimens.)

*To all whom it may concern:*

Be it known that we, MOSES PROSSER DAVIES, Ph. C., M. P. S., chemist, residing at 16 Gloucester road, Regent's Park, N. W., and EDWIN WILDING, chartered accountant, residing at No. 2 Clements Inn, Strand, London, England, subjects of the King of Great Britain, have invented certain new and useful Improvements in or Relating to Yeast, (for which we have applied for a patent in Great Britain, No. 8,777, dated April 29, 1901,) of which the following is a specification.

The object of this invention relates to an improved method of preparing yeast, preferably in the form of a powder, which will be exceedingly efficient and rapid in its action and at the same time entirely free from the impurities which are commonly contained in commercial yeast.

In carrying out this invention the raw yeast, as obtained whether from a brewery or a distillery or in the form of leaven-yeast, is in the first place thoroughly washed with water (save and except the leaven-yeast, which is not washed) to remove certain impurities—notably mucilaginous substances, bacteria, bitterness of the hop, and coloring-matter—and the yeast is thereby rendered pure and clean and is finally allowed to settle. The water is then drawn off, and any water remaining is removed by pressing the yeast, which is dried and reduced to a powder, with which is mixed farina—say from ten per cent. to twenty-five per cent., but preferably twenty-five per cent.— for the purpose of making the powder light and free and also to prevent the formation of a cake. It is desirable that the addition of the farina should not in any way interfere with the rapidity of the yeast's action, and it has been found that potato-meal is the most suitable form of farina for this purpose, as the mixture of the potato-meal with the yeast-powder makes a very effective ferment and the farina preserves and feeds the yeast. A small percentage of diastatic meal or other diastatic preparation, such as malt-flour—say from one per cent. to five per cent.—is finally added to the yeast-powder, the effect of this addition being that when the yeast-powder is mixed with flour the diastase converts a small quantity of the flour into sugar, which strengthens the yeast by assisting the alcoholic fermentation and gives a start to the complete leavening of the flour. Any ordinary yeast preservative, such as tartaric acid, may be added to the mixture to the extent of, say, one-half per cent. to check the increase of bacteria. The yeast is then passed through a coarse hair sieve.

Yeast-powder prepared according to this method is very clean, does not darken in color or become damp, and will keep for a considerable time without showing any signs of decomposing or becoming sour. It is therefore well adapted for storing or for sale.

If desired, the yeast-powder may be compressed into tablets for convenience in packing and handling.

Having now described our invention, what we claim as new, and desire to secure by Letters Patent, is—

1. A yeast-powder consisting of a fermented dried and sifted mixture of washed yeast with potato-meal and a small quantity of malt-flour.

2. A yeast-powder consisting in powdered yeast, potato-meal, malt-flour and a small quantity of tartaric acid; substantially as described.

In witness whereof we have hereunto set our hands in the presence of two witnesses.

MOSES PROSSER DAVIES.
E. WILDING.

Witnesses:
  HERBERT E. NEWTON,
  VICTOR D. GEDDES.